United States Patent [19]

DiPalma et al.

[11] Patent Number: 4,974,766
[45] Date of Patent: Dec. 4, 1990

[54] VEHICLE ROOF TOP CARRIER AND METHOD OF USING SAME

[75] Inventors: Vince F. DiPalma, Downey; L. R. Niguet, Los Angeles, both of Calif.

[73] Assignee: Sportstore Systems, Inc., Calif.

[21] Appl. No.: 287,833

[22] Filed: Dec. 21, 1988

[51] Int. Cl.⁵ .................................................. A45F 1/16
[52] U.S. Cl. ..................... 224/328; 224/315; 224/316; 224/319; 224/282
[58] Field of Search ............... 224/282, 309, 315, 316, 224/319, 320, 321, 324, 328

[56] References Cited

U.S. PATENT DOCUMENTS

| | | | |
|---|---|---|---|
| 2,754,041 | 7/1956 | Chaudiere | 224/320 |
| 2,920,802 | 1/1960 | Cook | 224/328 |
| 3,095,129 | 6/1963 | Kerr | 224/319 |
| 3,861,572 | 1/1975 | Norris et al. | 224/319 X |
| 3,901,422 | 8/1975 | Anderson et al. | 224/320 |
| 4,362,258 | 12/1982 | French | 224/309 |
| 4,420,105 | 12/1983 | Nepper | 224/328 |

FOREIGN PATENT DOCUMENTS

| | | | |
|---|---|---|---|
| 648303 | 5/1964 | Belgium | 224/328 |
| 1939154 | 2/1971 | Fed. Rep. of Germany | 224/328 |
| 2048462 | 4/1972 | Fed. Rep. of Germany | 224/328 |
| 2514889 | 10/1976 | Fed. Rep. of Germany | 224/328 |
| 3039806 | 7/1982 | Fed. Rep. of Germany | 224/320 |
| 2467738 | 5/1981 | France | 224/319 |

*Primary Examiner*—Ernest G. Cusick
*Attorney, Agent, or Firm*—Bernard L. Kleinke; William P. Waters; Jerry R. Potts

[57] ABSTRACT

A vehicle roof top carrier having a base which is secured removably to the roof rack of a vehicle. A hard, aerodynamically shaped cover closes over the base, thereby protecting the contents of the carrier from the elements. The base has a plurality of downwardly opened channels to enable the base to fit over the vehicle roof rack and in close proximity to the vehicle roof. Removable fastening devices, protectably disposed within the carrier, secure elements of the rack within the channels to hold the carrier securely and removably in place over the rack. Thus, when the cover, which can be locked to the base, is in its closed position, the means of attachment of the base to the vehicle roof rack is protected from access by unauthorized persons.

9 Claims, 2 Drawing Sheets

VEHICLE ROOF TOP CARRIER AND METHOD OF USING SAME

DESCRIPTION

1. Technical Field

This invention relates generally to a vehicle roof top carrier and a method of using it. More particularly, it relates to a roof top carrier which attaches to a vehicle roof rack for enclosing cargo.

2. Background Art

Vehicle roof top carriers are known. In general, they are attached to the metal roof racks on automobiles and station wagons. The typical vehicle roof top carrier has an opened top base portion for supporting cargo, and a cover for closing over the base portion.

The cover may be as simple as a tarpaulin which is tied to the base or to the vehicle roof rack, thereby holding down the contents of the cargo and offering some measure of protection from the elements. For example, reference may be made to U.S. Pat. No. 2,754,041. Other covers are of more sturdy construction, and some are attached by hinges to the base.

The vehicle roof top carriers which employ simple covers, such as a tarpaulins, have limitations. In the first place, protection of the cargo from rain and other environmental factors, is limited especially since the tarpaulin, if not very securely tied down, can shift while the vehicle is in motion. Further, a simple cover, such as a tarpaulin, affords very little protection from theft, since it is very easily removed or cut, thereby providing easy access to the cargo.

The limitations of simple fabric covers are reduced with vehicle roof top carriers which utilize a hard cover. Such hard covers represent significant advantages over a tarpaulin or other fabric cover from the aspects both of environmental protection of the cargo, and of protection from theft.

Often, in vehicle roof top carriers having an attached hard cover, the cover is composed of metal or fiberglass material, and is frequently hinged to a base at one side thereof. For example, reference may be made to U.S. Pat. No. 3,095,129.

Thus, the cover opens to one side of the vehicle only. This limits convenient access to the other side of the carrier opposite the hinge. This factor presents limitations in the loading and unloading of cargo, especially when access to the carrier is obstructed by a structure or another vehicle. In addition, it is frequently difficult in hinged cover carriers to retrieve items stored near the hinge. In such cases, it is often necessary to remove some items before gaining access to the desired item.

This limitation is even more significant when the carrier is attached to the top of a tall vehicle, such as a van. In these cases, when it is necessary for the user to retrieve items from the carrier disposed near the hinged side thereof, it is necessary to reach over the other contents of the carrier, to gain access to the desired items located near the hinge. In order to accomplish this task, it is frequently necessary to stand on a ladder or elevated surface in order to retrieve such items. Therefore, when a carrier is installed on a tall vehicle, free access to all contents of the carrier would be desirable, especially without the aid of a ladder or other such device.

Thus, it would be highly desirable to have a vehicle roof top carrier having the protective and anti-theft characteristics of the hard cover prior art carriers, without the limitation of access to the carrier from one side only.

Another common characteristic of prior art vehicle rooftop carriers is that they frequently rest upon, and are attached to, the metal roof rack, such as the carrier shown in U.S. Pat. No. 3,503,547. Typically, carriers attached in this fashion have a large, unsightly air space between the base of the carrier and the vehicle roof top which impart undesirable aerodynamic characteristics to the moving vehicle. In addition, because these carriers rest on the roof rack, a potential thief can readily observe and have access to the attachment devices affixing the carrier to the roof rack. Thus, unauthorized access to the carrier, or unauthorized removal of the carrier from the rack, may be possible.

In light of the above, it would be very desirable to have a vehicle roof top carrier with positive aerodynamic characteristics, and without the limitation of having its means of attachment readily discovered by a potential thief. Of course, at the same time, such a new vehicle roof top carrier should possess the previously indicated desirable advantages and features.

Varieties of vehicle roof top carriers are known. For example, reference may be made to the previous cited patents, as well as U.S. Pat. No. 3,861,572 and 3,901,422.

It will be readily understood that vehicle roof top carriers must be securely attached in order to prevent damage to the contents and to avoid carrier movement when the vehicle is moving. In the latter regard, separation of the carrier from a moving vehicle would present very serious safety problems for others on the road and probably, damage to the carrier and its contents. For this reason, the carrier must be securely attached to the roof rack so as to resist forces tending to move it laterally, longitudinally and vertically. Failure to prevent movement of the carrier in any of the three axes of possible movement can lead, on one hand, to cargo damage, because of vibrations and, on the other hand, to possible unwanted separation of the carrier from the vehicle.

As a clear illustration of possible problems associated with the attachment of a carrier to a vehicle roof top, reference may be made to U.S. patent 3,861,572, which discloses a roof rack having a pod resting on top of the members of a vehicle roof rack. The pod is held in place by frictional attachment by the use of shoes, which are pressed frictionally into engagement with laterally offset roof rack tubular members. In use, such an attachment device can become loose especially if the vehicle is moving along rough surfaces. Further, the patented carrier has a substantial air gap between itself and the vehicle top, whereby air rushing through the gap during vehicle motion, may impart vibratory motion to the carrier, thereby possibly damaging its contents and further causing a loosening of the carrier from the roof members. More importantly, vibratory movement caused by air flow could lead to an unwanted loosening of the frictional attachments and complete separation of the carrier from the vehicle.

Further, the patented carrier attachment mechanism provides only limited protection against lateral carrier movement. Also, protection is even more limited, if not non-existent, with regard to vertical movement, which might be caused by wind or travel on a bumpy road.

In addition, the insertion of heavy cargo in the patented carrier, during vehicle acceleration and deceleration, could shift the carrier longitudinally relative to the roof rack. Under extreme conditions, this shifting could lead to severe movement of the carrier relative to the roof rack, thereby resulting in damage to the carrier and its contents.

It is, therefore, apparent that the carrier of the present invention must be securely, and yet removably, attachable to the vehicle roof members.

Thus, none of the prior known vehicle roof top carriers overcome all of the foregoing problems in a practical, cost effective manner. Thus, it would be desirable to have such a carrier, which not only achieves the desired features, but also is aesthetically pleasing in appearance.

SUMMARY OF INVENTION

It is the principal object of this invention to provide a new and improved vehicle roof top carrier which attaches removably to a vehicle roof rack in a secure manner, and has a cover which can be displaced from its base in a very convenient manner.

It is a further object of the present invention to provide a new and improved vehicle roof top carrier constructed in such a manner that its cargo and vehicle attachment mechanism, are protected from access by unauthorized persons.

It is a still further object of the present invention to provide an aerodynamically shaped vehicle roof top carrier which protects its cargo from the elements.

Briefly, the present invention relates to a vehicle roof top carrier having a base which is secured removably to the roof rack of a vehicle. A hard, aerodynamically shaped cover closes over the base, thereby protecting the contents of the carrier from the elements. The base has a plurality of downwardly opened channels to enable the base to fit over the vehicle roof rack and in close proximity to the vehicle roof. Removable fastening devices, protectably disposed within the carrier, secure elements of the rack within the channels to hold the carrier securely and removably in place over the rack. Thus, when the cover, which can be locked to the base, is in its closed position, the means of attachment of the base to the vehicle roof rack is protected from access by unauthorized persons.

The cover has a smoothly contoured, chamfered, wedge shape configuration. It is swingably attached to the base for movement between a closed position over the base, and an opened position spaced above the base to provide for 360° access to the entire contents of the carrier, without the need for using a ladder. A pair of links on opposite sides of the carrier permit the cover to be raised manually upwardly from the base in such a manner as to provide the 360° access to the base and its contents. On each side of the carrier there is a piston cylinder assembly which is pivotally attached to the base and, through its link mechanism, to the cover, to assist the manual lifting of the cover off of the base in a convenient manner, with very little effort by the user.

BRIEF DESCRIPTION OF DRAWINGS

The above mentioned and other objects and features of this invention and the manner of attaining them will become apparent, and the invention itself will be best understood by reference to the following description of the embodiments of the invention in conjunction with the accompanying drawings, wherein.

BEST MODE FOR CARRYING OUT THE INVENTION

Figure 1:
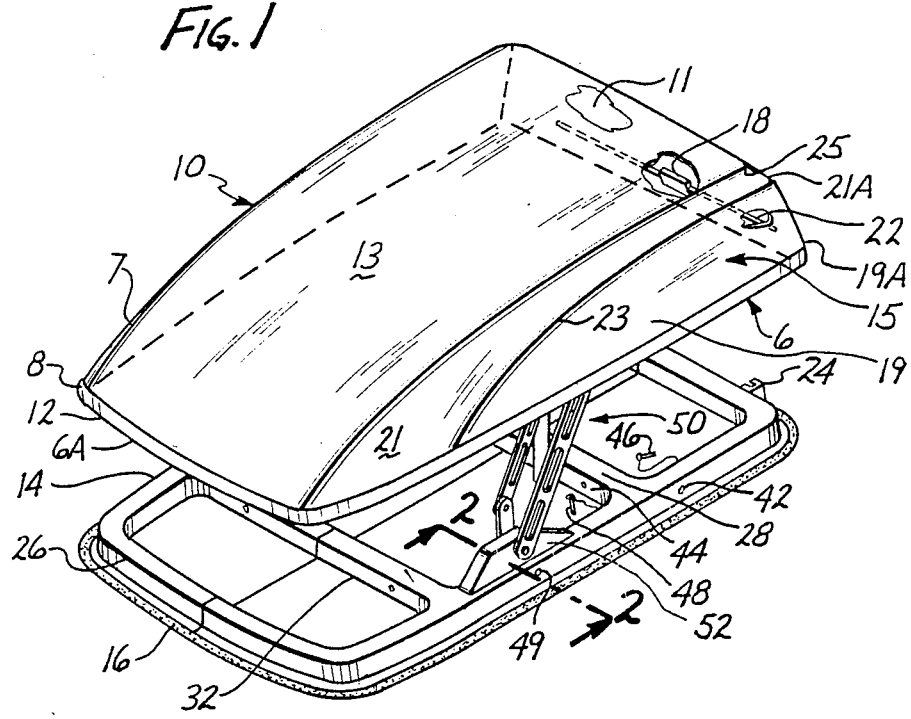
FIG. 1 is a pictorial view of a vehicle roof top carrier which is constructed according to the present invention, and which illustrates the carrier in the opened condition.

Referring now to the drawings, there is depicted, in FIG. 1, a vehicle roof top carrier 10 which is constructed according to the present invention. The carrier 10 is adapted to fit over, and be attached removably and securely to a vehicle roof rack, a portion of which is shown, in FIG. 2, mounted on top of a vehicle roof 4. In general, the roof rack is comprised of a pair of laterally offset rails, one on the right side of the vehicle, the other on the left and a plurality of transverse rails therebetween. The right and left rails are fixed to posts which are anchored to the vehicle roof.

The carrier 10 generally comprises a cover 12 which is removably attached to a base 14. The base 14 is of molded, one piece construction and is generally dish shaped to hold items, not shown. In one form, it is releasably attached to the vehicle roof rack members so that the attachment devices are inaccessible when the carrier 10 is in the closed condition. In another form, the base is fixed directly to the vehicle roof. In this case, also, the devices fixing the base to the vehicle roof are inaccessible when the carrier is in the closed condition.

For the purpose of controlling the movement of the cover 12 in relation to the base 14, a pair of link/piston cylinder assembly mechanisms is utilized. Each is spaced laterally from the centerline of base 14. The link/piston cylinder assembly mechanism 50, depicted in FIG. 1, is located to the left of the centerline of base 14, when viewed from the rear of the carrier 10. A similar link/piston cylinder assembly, not shown, is located on the right side of the carrier 10, when viewed from the rear thereof.

The mechanisms enable the user to raise the cover 12 off of the base 14 into a position spaced completely thereabove, as shown in FIG. 1. In this regard, the mechanisms cause the cover 12 to swing upwardly and forwardly into an opened position (FIG. 1) by assisting forcibly the movement thereof in a controlled manner. Thus, the large, bulky cover 12 is easily raised into the opened position by the user, who only is required to exert minimal manual force on the cover 12.

Figure 2:
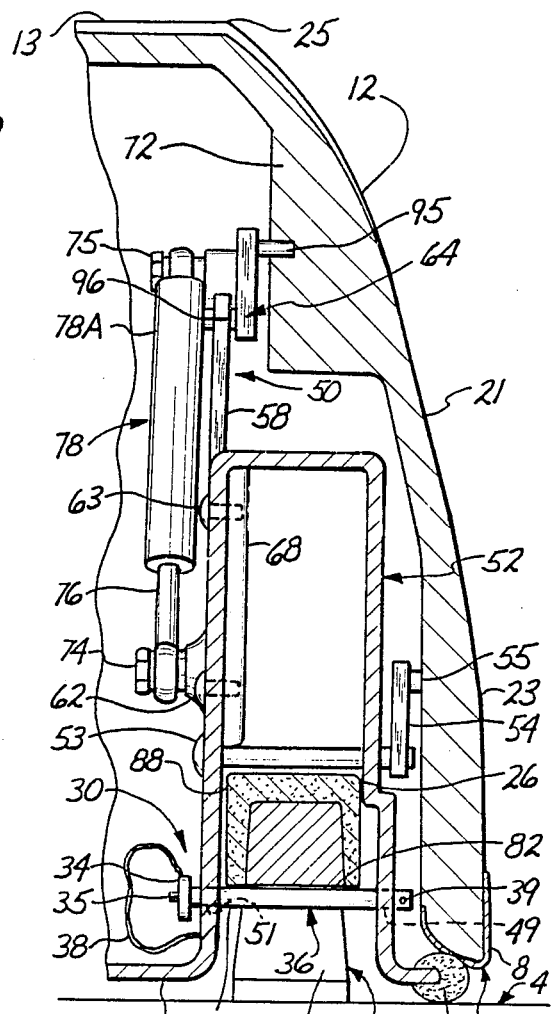
FIG. 2 is an enlarged sectional view of the left side of the cover taken substantially on line 2—2 of FIG. 1, when the carrier is in the closed condition.

The cover 12 is retained by the mechanisms in the opened position to permit 360° access to the contents (not shown) resting on top of the base 14. The cover 12 is retained in the raised position by the mechanisms in a stable manner, until the user exerts downwardly directed forces on the cover 12 manually, to cause it to swing rearwardly and downwardly controllably into a closed position in registration with the base 14 for covering over it, as indicated in FIG. 2. In the closed position, the cover 12 is locked in the closed position with the contents (not shown) safely within the carrier 10.

The cover 12 is generally dish shaped, having a generally hollow interior. It is of one piece construction composed of molded material, such as molded fiberglass material. It can be painted to match the finish of the vehicle to which it is attached thereby providing a continuous, one piece appearance to the vehicle and the carrier.

The base 14 is also of one piece construction and is composed of molded material, such as molded fiberglass material. As in the case of the cover 12, the base 14 can be painted to match the vehicle finish.

Considering now the base 14 in greater detail, with respect to FIGS. 1 and 2, the base 14 has a downwardly open peripheral channel 26 extending along its entire periphery which is interconnected with a forward transverse downwardly open channel 32 and a similar downwardly open rear transverse channel 28. These channels permit the base 14 to fit over respective roof rack peripheral rails (such as rail 82 of FIG. 2), and transverse members (not shown), of a vehicle roof rack 9. The peripheral channel 26 and the transverse channels 28 and 32, have a depth which is slightly less than the height of the vehicle roof rack rails, such as rail 82 of FIG. 2 so that with fastening devices in place, the base 14 is held against the roof rack in a latched condition. While in this condition, movement of the base relative to the rack, is limited in three axes, i.e. lateral, longitudinal and vertical. In addition, the peripheral channel 26 and the transverse channels 32 and 28 are lined with a cushioning material, such as a neoprene rubber cushion 88 for reducing relative motions between the carrier 10 and the roof rack and, further, for reducing carrier vibration. A preferred thickness for the cushion 88 is in the range of approximately ¼ inch to ½ inch.

In addition, because of the slight difference in channel depth in relation to roof rack member height, with the carrier 10 in place, there is a small space between the vehicle roof and the base 14. This space permits air circulation and water, such as rain, is free to flow from under the base 14 and away from the carrier 10.

With reference now to the method of attachment of the base 14 to the vehicle, a series of fastening devices, such as a series of compression pins generally indicated at 30 in FIG. 2, are inserted through their respective openings in both the peripheral and transverse channels. For example, compression pins 46 and 48 (FIG. 1), are adapted to extend through corresponding openings 42 and 44, in the peripheral channel 26 and the rear transverse channel 28.

Considering now the fastening devices 30, with reference to FIG. 2, a compression pin 36 generally comprises a rod 37 for insertion through openings 49 and 51, similar to the openings 42 and 44 of FIG. 1, a button 35 and a flange 34. At the tip end of the compression pin 30, opposite the flange 34, is a plurality of ball bearings such as ball bearing 39. Manual movement of the button 35 toward the flange 34, retracts the ball bearings radially inwardly, thereby permitting free insertion or extraction of the rod 37 through its pair of opening 49.

The openings, such as the opening 49 are fitted with grommets, not shown, to facilitate movement of the fastening devices therethrough.

To prevent loss of the fastening devices, especially when the carrier 10 is not attached to a vehicle, tethering means such as tether 38 (FIG. 2) is utilized to secure the compression pin 36 to the base 14.

Now, with further regard to the means whereby the base 14 is attached to the vehicle roof rack, FIG. 2 depicts the conventional vehicle roof rack 9, having a plurality of transverse rails (not shown) and a pair of longitudinal rails, such as the rail 82, which is fixed on top of a series of spaced apart roof rack posts, such as a roof rack post 84. The posts are each fixedly attached to the vehicle roof 4.

The peripheral channel 26, the rear transverse channel 28 and the forward transverse channel 32 are formed so as to fit snugly over the respective vehicle roof rack members thereby limiting lateral and longitudinal movement of the base 14 in relation to the vehicle roof rack. In addition, as depicted in FIG. 2, the fastening devices fit snugly under the vehicle roof rack rails, such as the longitudinal roof rack rail 82, thereby preventing vertical movement of the base 14 in relation to the vehicle roof rack.

A resilient seal 16 is fixed to the bottom rim of the base 14 to seal the cover 12 onto the base 14. As depicted in FIG. 2, when the cover 12 in the closed position, it engages the seal 16, thereby protecting the contents of the carrier from the elements.

With further reference to FIG. 1, a lock 18 mounted on the cover 12 has two transverse arms such as a transverse arm 22 to engage a pair of catches, such as a catch 24, on the rear of the base 14 for locking purposes. When the cover 12 is in the closed position in relation to the base 14, operation of the lock 18 moves the transverse arms, such as the arm 22 into engagement with the catches, such as the catch 24, thereby locking cover 12 to the base 14.

Considering now the cover 12 in greater detail, with reference to FIG. 1, the cover 12 has a smoothly contoured, generally wedge shaped and chamfered configuration. It has a top wall that slopes downwardly from the rear of the cover to the front in a smoothly contoured manner terminating in a generally rectangular shaped rim 6. At the front edge of the cover 10 the rim is a curved line 6A.

The cover 12 generally comprises a rectangular rear wall 11, a generally rectangular top wall 13, a generally triangularly shaped left side wall 15, and a right side wall 7, which is similar to the left side wall 15. A finishing strip 8 extends along the rim of the cover 12 to engage sealingly the seal 16, when the cover is closed as shown in FIG. 2.

Considering now the left and right side walls, the left side wall 15 will now be considered in greater detail without describing the similar right side wall 7 in greater detail. The side walls are smoothly contoured and slightly convex at their outer surface. The left side wall 15 generally comprises a skirt panel 19 and a gore panel 21. The gore panel 21 is integrally connected to the top wall 13 along a top line 25 for providing a generally triangularly shaped chamfered, aerodynamic surface. The gore panel 21, on its bottom side, is integrally connected to the generally triangularly shaped skirt panel 19 along a line 23.

The gore panel 21 has a rear marginal edge 21A and a front marginal edge terminating to form a part of rim 6A.

The side line 23 extends forwardly from the back wall 11 in a generally straight line for approximately half the length of the cover 12 at which point the side line 23 curves smoothly downwardly terminating at the finishing strip 8 at a point located approximately three quarters of the length of cover 12 from rear wall 11. The top line 25 begins at the back of top wall 13 where said top wall joins rear wall 11. It is comprised of an essentially curved line portion which extends forwardly in a generally straight line for approximately six tenths of the length of the cover 12 at which point it curves smoothly downwardly to join the finishing strip 8.

When the carrier 10 is in the opened position, the cover 12 is spaced above and slightly to the rear of the base. In its opened position, the cover 12 shields a substantial area of the base against exposure to rain and snow to protect the cargo (not shown) while the carrier 10 is open. Further, the cover 12 has an aerodynamic configuration thereby presenting reduced wind resistance, both in the opened and closed conditions.

Considering now in greater detail the link/piston cylinder assembly mechanisms, with reference to FIGS. 1, 2 and 2A, the left mechanism 50 will now be described, it being understood that the right mechanism (not shown) is similar to it.

In order to provide stability for the cover 12 in its opened position, a pair of links are mounted on opposite sides of an upstanding stud 52. The stud 52 is integrally formed on the peripheral channel 26 near the rim of the base 14.

The links are laterally spaced apart and are pivotally attached at their bottom ends at opposite sides of the stud 52. At their upper ends, the links are pivotally attached to the cover 12.

A piston cylinder assembly 78 is pivotally connected at its bottom end to the stud 52 and at its other end to one of the links intermediate its ends for limiting the swinging motion of the cover 12 forwardly and for forcibly moving the cover into its opened position to assist the user in raising the cover.

The links generally comprise, an external link 54, an internal link 64 and an upright link 58.

At its upper end, the external link 54 is pivotally attached at 55 to the inside surface of the cover 12 at approximately the mid-portion of the cover near the rim 6A. At its lower end, the external link 54 is pivotally attached at 53 (FIG. 2), to the outer side of the upstanding stud 52 near the bottom central portion thereof.

Figure 2A:
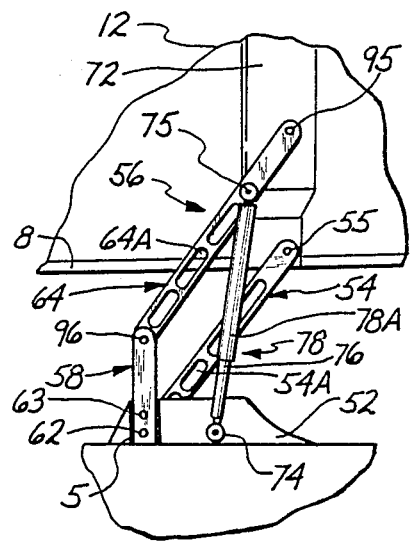
FIG. 2A is a fragmented, reduced scale, right side elevational view, depicting the link/piston cylinder assembly mechanism of FIG. 2.

With reference to FIG. 2A, the upright link 58 is located in a recess 5 on the inner side of the upstanding stud 52 near the central portion thereof. The upright link is fixed at its bottom, at 62 and 63, to a plate 68 which abuts the inner left wall of the upstanding stud 52 thereby securely holding the upright link 5 in place.

At its upper end, the upright link 58 is pivotally attached at 96 to the lower end of the internal link 64. The internal link 64, in turn, is pivotally attached, at 95, to a flat shoulder 72 located on the inside of the cover 12 opposite the gore 21 and spaced apart from the rim 6A. The shoulder 72 extends inwardly over substantially all of the stud 52 when the cover 12 is closed (FIG. 2).

The internal link 64 and the external link, 54 each has a plurality of holes respectively, a hole 64A extending therethrough for reducing the weight of the links, and thus the carrier 10, and to reduce wind resistance when the cover 12 is in the opened position.

The internal link 64, the external link 54, and the upright link 58 are preferably composed of aircraft aluminum for strength and lightness.

At all times, whether the carrier 10 is in the opened or the closed configuration or while the cover 12 is being moved in relation to the base 14, the external link 54, and the internal link 64, remain in a spaced apart, parallel relationship to each other.

In operation, viewed from the right side of the carrier 10, as the cover 12 is raised, the external link 54 and the internal link 64 rotate in a counter clockwise direction from a forwardly inclined position to a rearwardly inclined position.

A piston cylinder assembly 78 for controlling the movement and extent of travel of the cover 12 in relation to the base 14 is shown in FIGS. 1, 2 and 2A. The piston cylinder assembly 78 is comprised of a gas containing cylinder 78A. Extending from the cylinder 78A is a piston 76 which is forced out of the cylinder 78A extensively to exert a force on the cover during the opening of the carrier 10, and which is forced extensively into the cylinder 78A by the manual movement of the cover 12 when it is closed. Thus, a smooth, controllable rate of movement of the cover 12 in relation to the base 14 results, thereby reducing the effort required to manually move the cover 12.

A universal joint such as a ball joint 74 attaches the piston 76 to the stud 52 for universal rotation thereabout. At its upper end, the cylinder 78A is attached by a universal joint such as ball joint 75 to the internal link 64, at a point intermediate the link's middle and upper end for universal rotation thereabout. When the cover 12 is in the opened condition, the ball joints 74 and 75 permit some lateral movement of the cover 12. During the closing operation, the capability of slight lateral movement permits ready alignment of the cover 12 with the base 14 and easy registration of the cover with the base.

Figure 3:
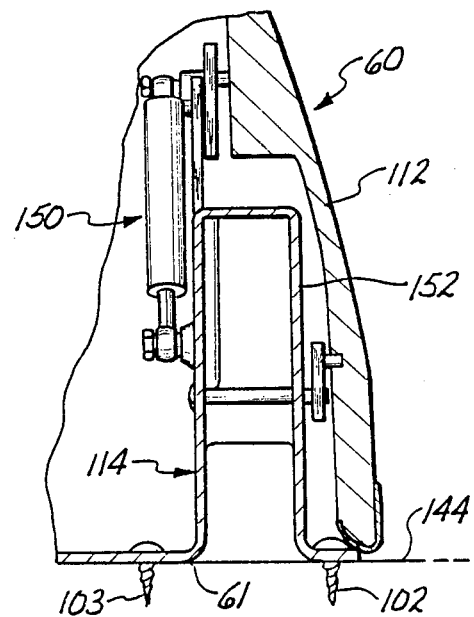
FIG. 3 is a fragmented view, similar to the view of FIG. 2, illustrating another vehicle roof top carrier, which is also constructed according to the present invention, and which is attached directly to the top of a vehicle.

Referring now to FIG. 3, there is depicted a vehicle roof top carrier 60, which is also constructed according to the present invention. The carrier 60 is similar to the carrier 10 of FIG. 1, except that the carrier 60 is attached fixedly directly to the outer surface of a vehicle roof 144 by suitable fastening devices such as screws 102 and 103. By fastening directly to the vehicle roof, the carrier 60 may be installed on a vehicle not provided with a roof rack.

A base having an open, generally pan shape, generally indicated at 114, comprises a pair of laterally shaped apart upstanding studs, such as a left stud 152. The right stud, not shown, is similar to the left stud 152, which is generally similar to the stud 52 of FIG. 1. A cover 112 generally similar to the cover 12 of FIG. 1, is adapted to be moved between opened and closed positions by means of a link/piston cylinder assembly mechanism 150 which is similar to the link/piston cylinder assembly 50 of FIG. 1.

Figure 4:
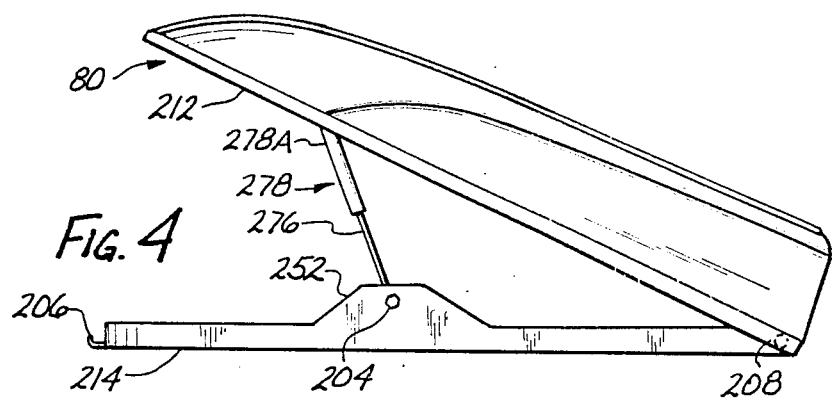
FIG. 4 is a side elevational view depicting another roof top carrier which is also constructed according to the present invention.

In FIG. 4 there is depicted a roof top carrier 80, which is also constructed in accordance with the present invention. A cover 212, which is similar in configuration to the cover 12 of FIGS. 1, 2 and 2A, is attached by hinge means 208 to a base 214. A piston cylinder assembly 278, similar to the piston cylinder assembly 78 of FIG. 2, is attached to the cover 212 and the base 214 for controlling the rate and extent of movement of the cover 212. The assembly 278 comprises a gas containing cylinder 278A which is pivotally attached to the cover 212 and a piston 276 which is pivotally attached to stud 252 for limiting the distance of travel of the cover 212 and to assist the user in raising the cover.

At the upper end of the cylinder 278A, not shown, is an upper universal joint, similar to the upper universal joint 75 of FIGS. 2, and 2A, which is pivotally attached to cover 212 for universal rotation thereabout. Similarly, at the lower end of piston rod 276, not shown, is a universal joint, not shown, similar to the lower universal joint 74 of, FIGS. 2, and 2A which is pivotally attached to the stud 252 at 204.

A latch 206 is located in the front of the base 214 for holding the cover 212 against the base in a secured relationship.

The carrier 80 of the present invention is generally similar to the carrier 10 except for the manner in which carrier 80 opens and closes. While the cover 212 is generally similar to the cover 12 of FIG. 1, unlike the cover 12, the cover 212 is connected pivotally at 208 thereby enabling the carrier 80 to open and close in a clam shell configuration.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A vehicle rooftop carrier adapted to be secured to a roof rack of a vehicle, comprising:
   a base adapted to be secured to the roof rack of the vehicle;
   a cover for fitting over said base;
   a pair of link mechanisms connected pivotally between the base and the cover, for enabling the cover to swing between a closed position over the base and an opened position, spaced completely above the base in a separated manner, each one of the mechanisms including a pair of laterally spaced apart links pivotally attached to the base and to the cover, and a piston cylinder assembly for helping move forcibly the cover into its opened position, and for limiting the extent of travel of the cover into it's opened position, wherein one link of each pair of links is located externally of the other link and is connected pivotally at one end to the base and at the other end to the cover, said other link being pivotally connected at one end to the cover and pivotally connected at its other end to said base.

2. A vehicle rooftop carrier as set forth in claim 1, wherein said cover includes a rim, and wherein said pair of link mechanisms permit said cover to swing upwardly and longitudinally relative to said base into an opened portion, with the plane of the rim of the cover being maintained substantially parallel to the base throughout the path of travel of the cover.

3. A vehicle roof top carrier as recited in claim 1, wherein said piston cylinder assembly includes a gas cylinder having at its upper portion a universal joint, said joint being pivotally attached to one of said links, and said cylinder having at its lower portion another universal joint, aid another joint being pivotally attached to said base.

4. A vehicle roof top carrier as recited in claim 1, said links of each one of said link mechanisms being pivotally attached to said base, one of said links and its piston cylinder assembly being pivotally attached to said base in a spaced apart relationship relative to one another.

5. A vehicle roof top carrier of claim 1, wherein said base includes at least one channel for engaging a vehicle roof rack and a mechanism for locking said base to said rack, said mechanism having a first locking means on said at least one channel and a second locking means for attaching to said first locking means to fix said base against a vehicle roof rack member.

6. A vehicle roof top carrier of claim 1, wherein each one of said pair of link mechanisms includes an upright member fixed to said base.

7. A vehicle roof top carrier of claim 1 wherein said base has at least one upstanding stud on each side each stud having a pair of links attached to it;
   said pair of links having a first element pivotally attached to said base and pivotally attached to said cover and a second element having a first member fixed to said stud and a pivotally attached to said cover whereby said links permit registration of said cover with said base when said carrier is closed.

8. A vehicle roof top carrier of claim 1 wherein said base has at least one piston cylinder assembly, said assembly being pivotally attached to said base and pivotally attached to said cover to assist forcibly the relative movement between said base and said cover.

9. A method of using a vehicle roof top carrier adapted to be secured to a vehicle roof rack having at least one member including:
   a base adapted to be secured to the roof rack of the vehicle;
   a cover for fitting over said base;
   a pair of link mechanisms connected pivotally between the base and the cover, for enabling the cover to swing between a closed position over the base and an opened position, spaced completely above the base in a separated manner, each one of the mechanisms including a pair of laterally spaced apart links pivotally attached to the base and to the cover, and a piston cylinder assembly for moving forcibly the cover into its opened position, and for limiting the extent of travel of the cover into its opened position, wherein one link of each pair of links is located externally of the other link and is connected pivotally at one end to the base and at the other end to the cover, said other link being pivotally connected at one end to the cover and pivotally connected at its other end to said base, whereby the carrier is used by:
   placing said base over said at least one member of a vehicle roof rack;
   fixing said base to said at least one member;
   controlling the movement of the cover so as to raise the cover upwardly and longitudinally to a position spaced completely above the base in a separated manner;
   placing an article to be carried on said base;
   controlling the movement of the cover so as to lower the cover into engagement with the base; and
   attaching releasably the cover of said carrier to the base.

* * * * *

UNITED STATES PATENT AND TRADEMARK OFFICE
CERTIFICATE OF CORRECTION

PATENT NO. : 4,974,766

DATED : December 4, 1990

INVENTOR(S) : Vince F. DiPalma

It is certified that error appears in the above-identified patent and that said Letters Patent is hereby corrected as shown below:

Column 7, line 50, after "link", delete "5", and substitute therefor --58--.

Column 7, line 58, after "link", delete ",".

Column 7, line 59, after "holes", delete "respectively", and substitute therefor --such as respectively,--.

Column 7, line 59, after "64A", insert --and a hole 54A--.

Column 9, line 3, after "of", delete ",".

Column 9, line 39, after "into", delete "it's", and substitute therefor --its--.

Column 9, line 59, after "universal joint", delete "aid", and substitute therefor --said--.

Column 10, line 20, before "pivotally attached", insert --second member--.

Column 10, line 21, before "cover whereby", insert --first member and pivotally attached to said--.

Signed and Sealed this

Tenth Day of November, 1992

Attest:

DOUGLAS B. COMER

*Attesting Officer*   Acting Commissioner of Patents and Trademarks